United States Patent [19]

Hänsel et al.

[11] Patent Number: 4,487,118

[45] Date of Patent: Dec. 11, 1984

[54] APPARATUS FOR CONTINUOUS PRODUCTION OF SOLID SUGAR COMPOSITIONS OR THE LIKE

[75] Inventors: Otto Hänsel, Hanover; Klaus Markwardt, Laatzen, both of Fed. Rep. of Germany

[73] Assignee: Otto Hänsel GmbH, Hanover, Fed. Rep. of Germany

[21] Appl. No.: 331,968

[22] Filed: Dec. 18, 1981

[30] Foreign Application Priority Data

Dec. 23, 1980 [DE]  Fed. Rep. of Germany ....... 3048904

[51] Int. Cl.³ .......................... B01F 13/06; B01F 7/02
[52] U.S. Cl. ...................................... 99/348; 99/355; 99/472; 426/660; 426/510
[58] Field of Search ................ 99/348, 472, 454, 485, 99/352, 355; 366/139; 426/660, 510, 579, 523

[56] References Cited

U.S. PATENT DOCUMENTS

| | | | |
|---|---|---|---|
| 2,278,701 | 4/1942 | Karr | 99/472 |
| 3,739,711 | 6/1973 | Nieblach | 99/348 |
| 3,754,466 | 8/1973 | Taralli | 99/472 |
| 4,285,271 | 8/1981 | Falek | 99/355 |

*Primary Examiner*—Robert W. Jenkins
*Attorney, Agent, or Firm*—Max Fogiel

[57] ABSTRACT

A method for the continuous production of a mass to be processed into hard candy from a solution of sugar, water, and glucose that is cooked, steamed out, and dewatered in a vacuum, with the resulting mass transferred to a mixer or similar device for further processing, is intended to permit the hard-candy mass to be removed from the vacuum without mechanical work and combine continuous cooking and continuous mixing in one closed candy-manufacturing process. The invention accomplishes this purpose by subjecting batches of the sugar solution to a vacuum at a stage in the process that is situated between the continuous cooking and the continuous processing and mixing.

4 Claims, 1 Drawing Figure

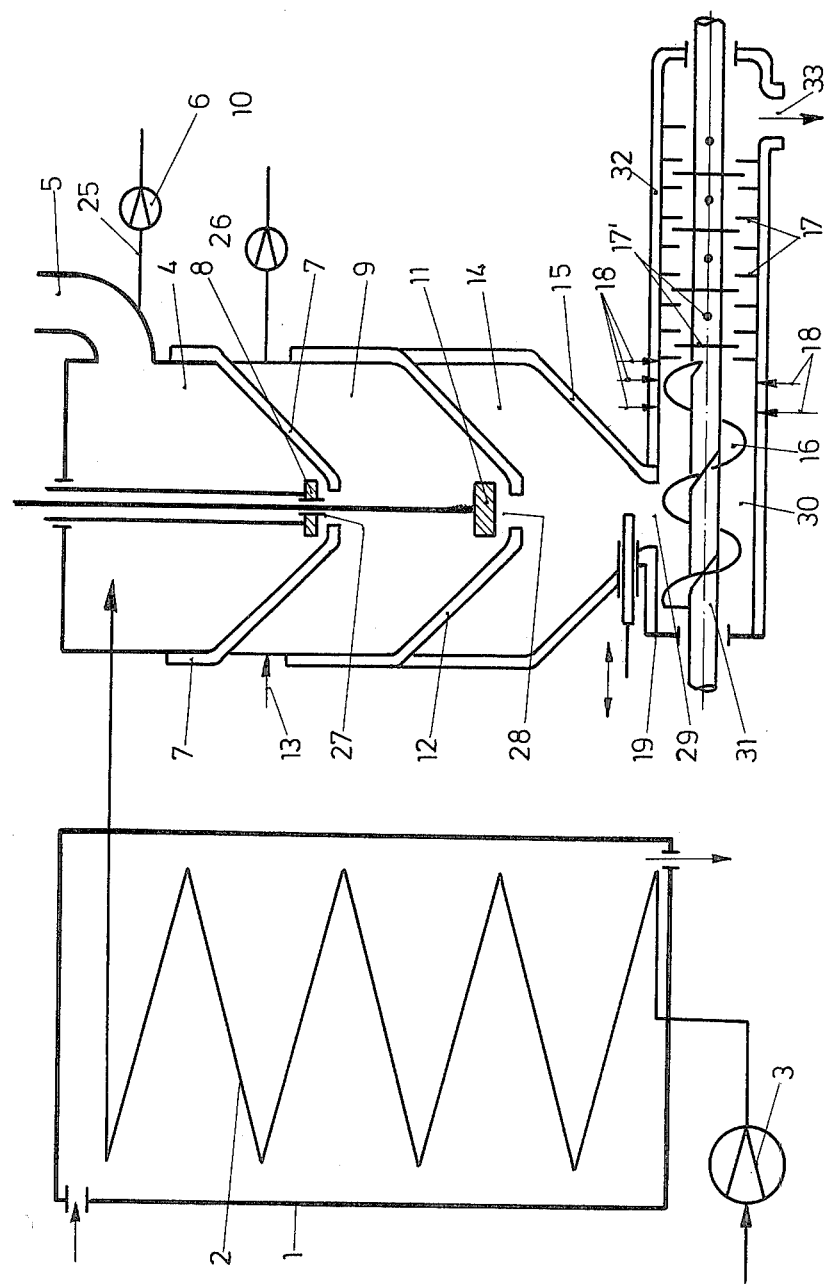

APPARATUS FOR CONTINUOUS PRODUCTION OF SOLID SUGAR COMPOSITIONS OR THE LIKE

The invention is a method for the continuous production of a mass to be processed into hard candy and an apparatus for carrying out the method. Hard-candy masses are usually manufactured from a solution of sugar, water, and glucose that is cooked, steamed out, and dewatered in a vacuum, with the resulting mass transferred to a mixer or similar device for further processing, where additional ingredients like flavorings, fragrances, colorings, acids, etc. are mixed in. This process is carried out with apparatus like that described for example in German Pat. No. 1 283 662 and in Auslegeschriften Nos. 1 923 637 and 2 512 423 and consisting essentially of a continuously operating cooler, a downstream steam-out chamber connected to a vacuum pump, and a device that mixes and delivers the mass for further processing. In apparatus of this type the mass is continuously cooked under a constant vacuum, and it is extremely difficult to extract the mass from the vacuum, requiring a great deal of power.

The invention is intended to eliminate this problem and is also intended to be a process and apparatus that permit the hard-candy mass to be removed from the vacuum without mechanical work and that combine continuous cooking and continuous mixing in one closed candy-manufacturing process. The invention accomplishes this purpose by subjecting batches of the sugar solution to a vacuum at a stage in the process that is situated between the continuous cooking and the continuous processing and mixing.

The apparatus that carries out this process is characterized by a second vacuum compartment that is connected to, and downstream from, the initial steaming-out and vacuum compartment, which is itself connected to the boiler, and that can also be connected, through a passage that can be closed off, to a reservoir positioned below it and opening into an extraction compartment that has a conveyor worm and to which a mixer is connected downstream. A compressed-air inlet can be connected to the second vacuum compartment to accelerate extraction.

It will be especially advantageous if the individual compartments are positioned one above the other with throughput valves in the communicating walls and capable of outside control.

The attached drawing is a diagram of one embodiment of the invention.

The invention has a cylindrical steam compartment 1 that has a steam inlet and that houses a cooking coil 2 through which the solution of sugar, water, and glucose that is to be processed is forced by a pump 3 and in which it is cooked. The solution to be processed usually has an 80% solids content at a temperature of about 110° C. and is heated to about 140° C. in the steam compartment. The cooked solution is then transferred into a steaming-out compartment 4 next to steam compartment 1, where the water vapor released from the cooked solution is separated from the sugar and escapes through vapor exhaust 5.

A vacuum pump 6 is connected to either steaming-out compartment 4 or vapor exhaust 5 through a line 25. This pump permits steaming-out compartment 4 to be employed as a vacuum compartment. The walls and floor of steaming-out chamber 4 are composed of double walls 7, the spaces between them being connected to a steam heater that permits simultaneous heating of the compartment.

There is a vacuum compartment 9 immediately under steaming-out compartment 4 and connected through line 26 to a vacuum pump 10 that can reinforce the vacuum in vacuum compartment 9 to promote steaming out.

Compartments 4 and 9 are connected by a throughput passage 27 that can be closed off with a throughput valve 8, which can be operated from outside, or left open to permit the candy mass to pass through. There is also an outlet 28 in the floor of vacuum compartment 9 that can be closed off by a valve 11, which can also be operated from outside. Throughput can be assisted by compressed air pumped into compartment 9 over an inlet 13. Like those of steaming-out compartment 4, the walls and floor of vacuum compartment 9 are composed of double walls 12, which are also connected to a heater.

Finally, there is a reservoir 14 under vacuum compartment 9 that also has double walls 15 that can be heated, as well as a central open outlet 29. These openly connect reservoir 14 with an extraction compartment 30, which houses a conveyor worm 16 mounted along the drive shaft 31. Outlet 29 into extraction compartment 30 can be adjusted with a slide 19. The operation of shaft 31, which powers the transport and mixing mechanisms, can be controlled with a speed regulator, not shown. Extraction compartment 30 opens into a mixing compartment 32 through which shaft 31 penetrates. Here, mixing devices 17 and mixing vanes 17' thoroughly mix additional ingredients like fragrances, colorings, acids, etc. supplied over inlets 18, which are not individually illustrated, into the mass. Mixing compartment 32 is emptied through outlet 33.

In operation, the sugar solution, which has been heated to 140° C. for example, is conveyed into steaming-out compartment 4, where water vapor is separated from the sugar and escapes through vapor exhaust 5. Vacuum pump 6 permits steaming-out compartment 4 to be employed as a vacuum compartment. The walls of the individual compartments are appropriately steam-heated.

When throughput valve 8 is open the sugar travels downstream into vacuum compartment 9, to which another vacuum pump is connected to provide additional vacuum (of up to about 0.95 bar) for the mass. Outlet valve 11 into compartment 9 is closed at this stage. When a previously determined amount (batch size) of mass has been collected in vacuum compartment 9, valve 8 is closed, interrupting the connection to vacuum pump 10. Finally, valve 13 and outlet valve 11 are opened to let air into vacuum compartment 9 so that candy mass can travel into reservoir 14 of the mixing system under the influence of gravity or if necessary with the assistance of compressed air supplied through valve 13.

From reservoir 14, the mass is continuously removed from the conveyor worm 16 of mixer 30, 32 and positioned between mixing devices 17 and mixing vanes 17'. Additional liquid or crystallized ingredients like flavorings, fragrances, colorings, acids, etc. are simultaneously added and mixed uniformly into the mass in the mixer. The amount of the various ingredients and the intensity of the process can be adjusted to the desired ratios with valve slide 19 or a speed regulator for the mixing chamber.

When vacuum compartment 9 is empty, valve 11 can be closed and vacuum pump 10 turned on to generate another vacuum in vacuum compartment 9. Valve 8 is then opened so that the mass collected in steaming-out compartment 4 can be drawn into vacuum chamber 9 until it contains the specific batch size desired.

We claim:

1. Apparatus for continuous production of a mass to be processed into hard candy from a solution of sugar, water, and glucose that is cooked, steamed out, and dewatered with the resulting mass transferred to mixing means for further processing, comprising: a continuous boiler for sugar solutions; downstream first steaming-out and vacuum compartment means connected to a vacuum pump; and mixing and extracting means for candy mass that is to be further processed; second vacuum compartment means connected to, and downstream from, said first steaming-out and vacuum compartment means, said first steaming-out and vacuum compartment means being connected to said boiler; reservoir means and a passage with blocking means, said first compartment means being connectable to said reservoir means through said passage, said passage being blockable by said blocking means; said reservoir means being positioned below said first compartment means; extraction compartment means having a conveyor and communicating with said reservoir means; and mixer means connected downstream to said extraction compartment means.

2. Apparatus as defined in claim 1, wherein said first and second compartment means and reservoir means are positioned one on top of the other, and throughput valves controlable from outside and located in walls in sequence between said first and second compartment means and reservoir means.

3. Apparatus as defined in claim 1, wherein said second compartment means has a compressed-air inlet.

4. Apparatus as defined in claim 1, wherein said second vacuum compartment means has a compressed-air inlet.

* * * * *